United States Patent [19]
Meacham

[11] 3,919,597
[45] Nov. 11, 1975

[54] SUBMINIATURE TELEVISION CAMERA

[75] Inventor: James H. Meacham, Laurel, Md.

[73] Assignee: Westinghouse Electric Corporation, Pittsburgh, Pa.

[22] Filed: May 16, 1972

[21] Appl. No.: 253,745

[52] U.S. Cl. .................... 315/382; 313/21; 313/44; 313/46; 178/DIG. 14

[51] Int. Cl.² .......................................... H01J 29/58

[58] Field of Search .......... 315/22, 382; 313/17, 21, 313/44, 46; 178/7.81, DIG. 14

[56] References Cited

UNITED STATES PATENTS

| | | | |
|---|---|---|---|
| 2,771,278 | 11/1956 | Slack | 313/46 X |
| 3,023,264 | 2/1962 | Allison | 313/44 X |
| 3,126,498 | 3/1964 | Bendell | 313/17 UX |
| 3,141,987 | 7/1964 | Altman | 313/17 |
| 3,321,577 | 5/1967 | Burke et al. | 178/7.81 X |

FOREIGN PATENTS OR APPLICATIONS

| | | | |
|---|---|---|---|
| 961,832 | 6/1964 | United Kingdom | 178/DIG. 14 |

OTHER PUBLICATIONS

"TV Cooled Thermoelectrically," Electronic Design, July 5, 1961.

*Primary Examiner*—Harvey E. Behrend
*Assistant Examiner*—P. A. Nelson
*Attorney, Agent, or Firm*—D. Schron

[57] ABSTRACT

In a subminiature TV camera, the tube and coil assembly is supported by a collar which gives mechanical strength to the assembly, draws heat from the tube into the main camera housing, and shields the tube socket assembly from external electrostatic pickup. The support collar acting as a rotation ring is engaged by the cylindrical coil assembly in a frictional fit which allows the coil assembly to be rotated for proper alignment with the tube. Flat multi-chip package compartments serve as top and bottom structural members of the housing which encloses the tube and coil assembly. The multi-chip package compartment gives structural strength to the housing, serves as heat sinks to draw heat from the coil assembly into the housing of the camera, and provides individual compartments for the electrical integrated circuit packages required for camera operation.

12 Claims, 3 Drawing Figures

SUBMINIATURE TELEVISION CAMERA

BACKGROUND OF THE INVENTION

1. Field of the Invention

This invention relates to the packaging of electronic elements into a subminiature configuration while providing for adequate heat withdrawal from those elements. Specifically, this invention relates to the provision of heat sinks for a sensor tube used in a television camera.

2. Description of the Prior Art

In the effort to bring about significant size and weight improvement in various electronic systems, heavy emphasis has been placed on the rapidly emerging hybrid integrated circuit fabrication techniques. As it has become possible to apply these techniques with greater success to produce miniaturized digital circuitry there has also been a need to package such circuitry more efficiently and effectively. Thus, paralleling the advances made in electronic miniaturization there has been a need to improve the mechanical packaging to take maximum advantage of the reduced size of the electronics involved.

In the area of television cameras it has been possible to reduce the essential electronics to five multichip hybrid packages. The use of miniaturized hybrid packages has indeed resulted in such a Westinghouse developed TV camera used in the Apollo Space Program. Housed in 1 × 1 inch ceramic flat packs, these packages have been utilized successfully in several compact television cameras. By heavy implementation of digital circuitry the camera electronics has been divided, both physically and electrically, into appropriate function blocks which allow the desired interblock isolation and logical circuit flow. These function blocks have been translated into individual ceramic packages to include a preamp hybrid package, a postamp hybrid package, a sync generator package, a sweep fail protect hybrid package, and a sweep hybrid package. Incorporating these packages with a television tube, coil assembly, and power supply has given an operating subminiature TV camera.

To achieve total reduction in size of an assembled camera system additional techniques in packaging have been required. While striving for reduction in size, it has been necessary to maintain structural and mechanical strength, proper electrical shielding, and withdrawal of heat from the tube and associated circuitry to the housing of the camera itself.

SUMMARY OF THE INVENTION

In accordance with the invention, there is provided a heat sink for an electron tube which is comprised of a cylindrical assembly which is concentric with the electron tube and positioned in heat exchange relationship therewith, a support collar aligned axially with the cylinder assembly and adapted to engage the cylinder assembly and the tube so as to hold the tube and the cylinder assembly in a fixed concentric relationship, and a socket assembly for receiving the tube which is shielded by the support collar in a manner to prevent external electrostatic pickup. Positioning tabs mounted on the cylindrical assembly are provided for rotating the assembly on the support collar and about the longitudinal axis of the tube.

DESCRIPTION OF THE PREFERRED EMBODIMENT

Figure 1:
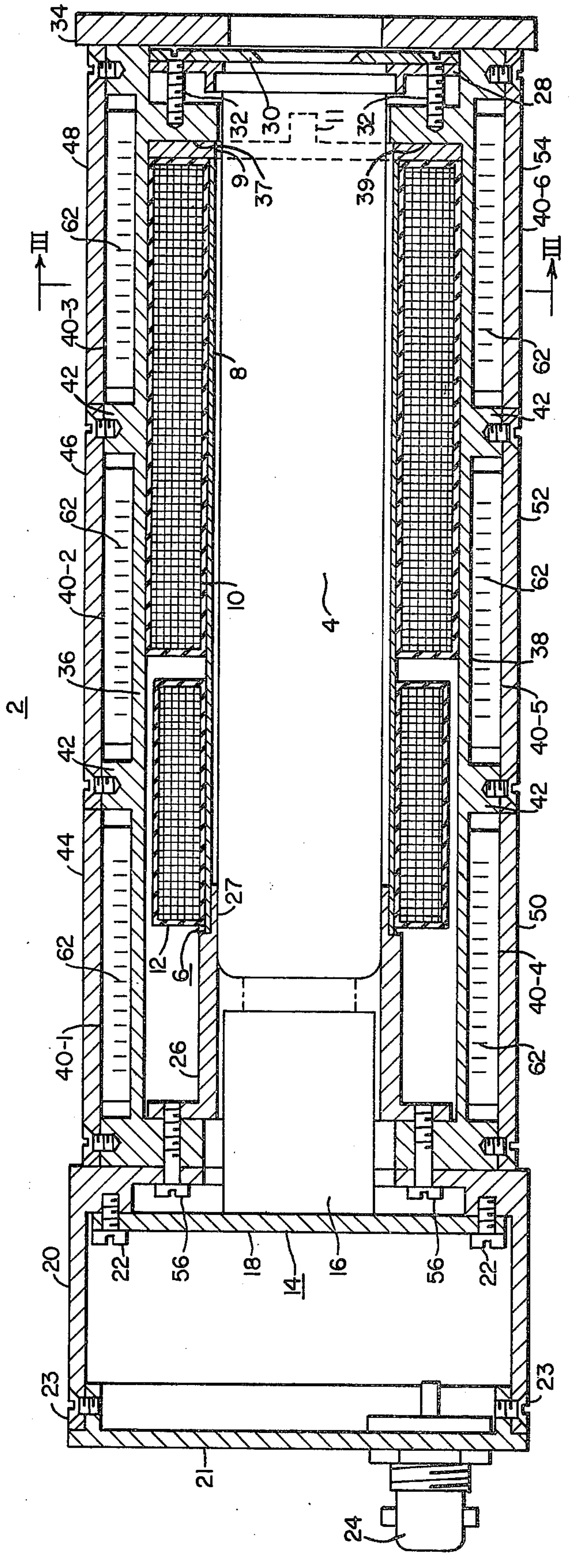
FIG. 1 is a cross section of a TV camera incorporating the preferred embodiment of this invention.

In FIG. 1 there is shown a cross section view of a subminiature TV camera system 2. Central to the camera system 2 is a sensor tube 4 which might typically be a vidicon sensor tube. Surrounding the tube 4 in a concentric fashion is a cylindrical assembly 6 which includes a thin walled cylinder 8 having deflection coils 10 and alignment coil 12 mounted thereon. Annular disc 9 is cemented firmly to the end of assembly 6 and is precision machined to bear against the internal lips 37 and 39 of multi-chip package compartment plates 36 and 38. A lubricant such as silicon grease may be applied to the surface of the disc 9 to facilitate rotation of the coil assembly about its longitudinal axis. Cylinder 8 is spaced apart from tube 4 over substantially the entire length of tube 4 but is close enough to be in heat exchange relationship. It is to be recognized that an all magnetic vidicon could be substituted with the addition of a focus coil current regulator. Thus, the packaging concept would be pertinent to a wide range of sensors including those using lead oxide, SEC, and EBS target mechanisms.

Tube 4 is received by the socket assembly 14 which includes socket 16 and a tube bias board 18. The tube bias board 18 is used to set the sensor operating point and would typically include beam, beam focus, and target voltage adjustment pots. The socket assembly 14 is attached to the rear housing 20 by bolts 22.

The rear housing 20 would typically contain the high voltage power supply for the television camera system 2. Terminal 24 would be used either as an input or output terminal for the camera system 2. Back cover plate 21, attached to housing 20 by fasteners 23 provides a seal against dirt and moisture while allowing ready access to the power supply.

The socket 16 partially extends into the support collar 26. The support collar 26 serves to hold a first end of tube 4 rigidly in place. The cylindrical assembly 6 slides over the lip 27 of support collar 26 which acts much as a rotation ring for cylindrical assembly 6. Thus, the cylindrical assembly 6 can be rotated on the lip 27 of support collar 26 to adjust its orientation in relation to tube 4. The support collar 26 acts to maintain both the cylindrical assembly 6 and the tube 4 in an axial position maintaining the cylindrical assembly in a concentric relationship to the tube 4.

The second end of tube 4 is held in axial alignment by tube clamp 28. Face plate mask 30 fitted over the tube clamp 28 limits the optical information available to the scanning area. The face plate mask 30 and the tube clamp 28 are held rigidly to the housing by fasteners 32. A front camera plate 34 provides the front housing cover to the camera system 2.

The primary longitudinal support structure for the top and the bottom of the camera system 2 is provided by the multi-chip package compartment plates 36 and 38. Plates 36 and 38 extend lengthwise parallel to the axis of tube 4. The plates 36 and 38 each have three compartments to receive the multi-chip hybrid packages 40-1 to 40-6. Each hybrid package 40-1 to 40-6 has terminal leads 62 emanating from opposite edges of the package. Each package 40-1 to 40-6 is isolated from the next adjacent package by ridges 42 of the multi-chip package compartment plates 36 and 38. The multi-chip hybrid packages are sealed into the compartments by the interlocking plate covers 44, 46 and 48 which are attached to plate 36 and by cover plates 50, 52 and 54 fastened to the plate 38.

It will be seen that the hybrid chip packages 40-1 to 40-6 are effectively sealed from dirt and moisture. However, each is easily accessible merely by removing one of the plate covers 44, 46, 48, 50, 52, or 54.

The multi-chip package compartment plates 36 and 38 and the support collar 26 are then fastened to the rear housing 20 by fasteners 56. The resulting assembly is a structurally strong package having the advantages of good heat transfer by means of the cylindrical assembly 6 which is in close heat exchange relation to tube 4 and by means of the support collar 26 which is in close heat exchange relation to the top and bottom plates 36 and 38 of the housing. Also, it will be appreciated that the support collar 26 is effective to shield the camera tube socket against external electrical pickup.

Figures 2, 3:
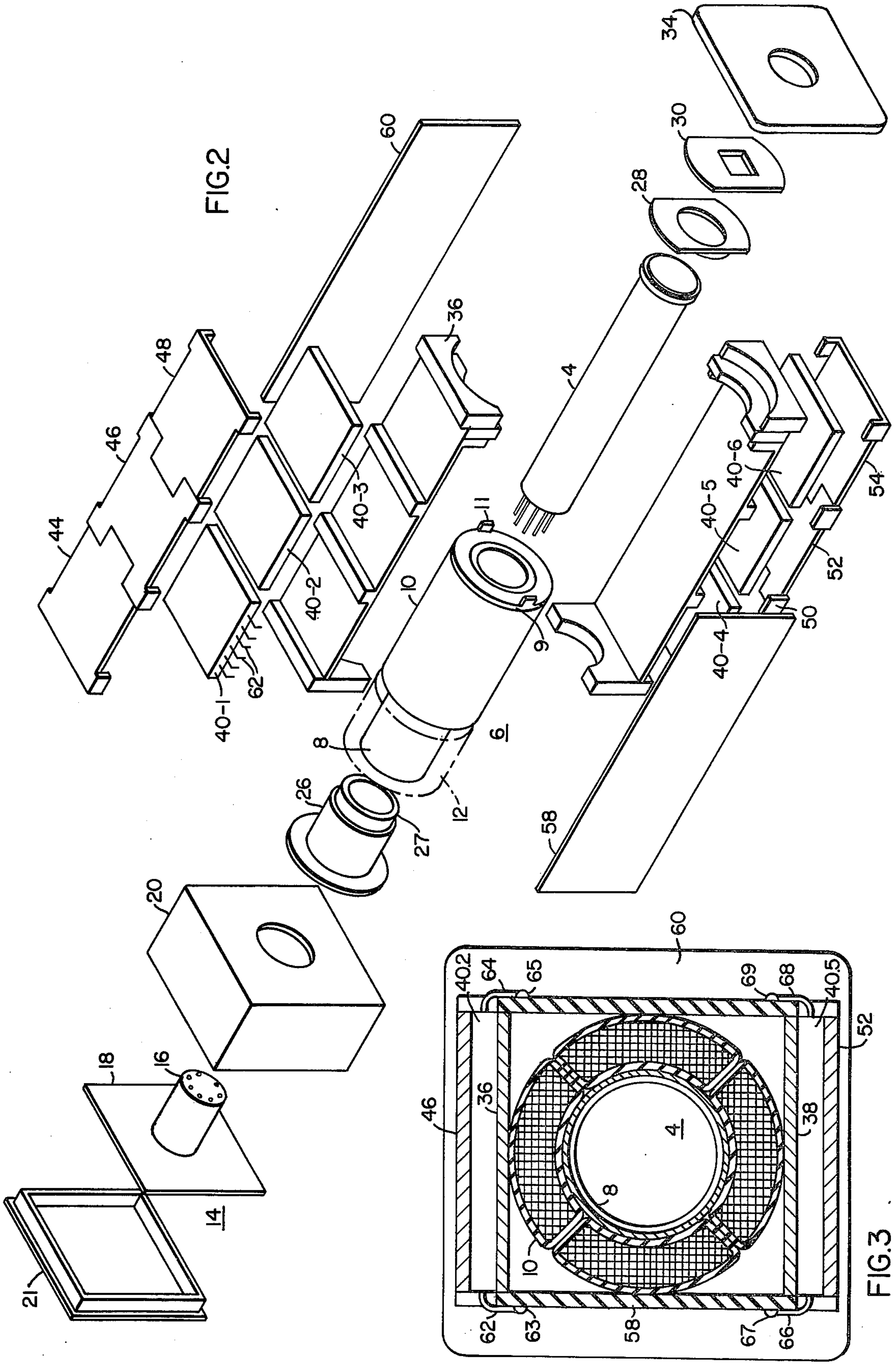
FIG. 2 is an exploded isometric perspective view of the TV camera shown in FIG. 1.
FIG. 3 illustrates a different cross section view of the TV camera shown in FIG. 1.

FIG. 2 is an exploded view of the television camera shown in FIG. 1. This view more precisely shows the interrelationship of the parts of the camera system 2. Since the components of the camera system 2 are identified by like symbols, it will not be necessary to describe in full detail FIG. 2. However, printed circuit boards 58 and 60, not shown in FIG. 1, are positioned so as to abut against the edges of top and bottom plates 36 and 38. These printed circuit boards 58 and 60 give some degree of structural rigidity to the assembly. Additionally, they are positioned so as to allow easy connections to each of the multi-chip hybrid packages 40-1 to 40-6.

In FIG. 2 provision is made for rotation of the cylindrical assembly 6 about its longitudinal axis. The assembly 6 rotates on the lip 27 of support collar 26 while bearing against the surfaces 37 and 39 of the plates 36 and 38. Tabs 11 which are mounted on diametrically opposite edges of the annular disc 9 provide projections parallel to the axis of the tube 4 which can be acted on easily by the operator of the camera system 2 with a tool such as a screwdriver to cause the cylinder assembly to rotate. Access is obtained by removal of the face plate 34. The tube clamp 28 and face plate mask 30 are so configured as to make access to tabs 11 quite simple. The tabs 11 project toward the face plate 34 a length not in excess of the combined thickness of tube clamp 28 and face plate mask 30. It would of course be possible to modify this arrangement such as by providing indentations in the annular disc 9 in place of tabs 11 which could likewise be acted on to rotate the cylinder assembly 6. In such a subminiature camera system as shown in FIG. 2 ease of access and simple means to rotate the deflection coils 10 are essential.

FIG. 3 shows a different cross sectional view of the television camera depicted in FIGS. 1 and 2. In FIG. 3 the tube 4 is positioned at the center of the enclosure having the printed circuit boards 58 and 60 as sides and plates 36 and 38 as top and bottom members. Concentric with the tube 4 and spaced slightly apart from tube 4 is cylinder 8. Mounted on cylinder 8 are the deflection coils 10. The multi-chip hybrid packages 40-2 and 40-5 are shown sandwiched between the multi-chip package compartment plates 36 and 38 and the cover plates 46 and 52. The leads 62 and 64 from multi-chip hybrid package 40-2 are configured to meet terminals 63 and 65, respectively. In a similar fashion leads 66 and 68 of multi-chip hybrid package 40-5 are configured to meet terminals 67 and 69, respectively. Thus, all electrical connections made after assembly of the TV camera assembly 2 are made at the edges of the printed circuit boards 58 and 60 where the leads from the various multi-chip packages conveniently meet the terminals of the respective printed circuit boards.

The packaging design disclosed herein is readily applicable to various magnetically deflected image systems. The electrical designer, having determined the design requirements for each hybrid package can efficiently fabricate a camera system by merely inserting such packages into the design shown above. The final packaging can be extremely small in size and the electrical interconnections necessary are made quite simple.

Being able to fabricate and package a camera in this manner gives structural strength, adequate electrical shielding of the tube socket, and sufficient heat sinks to allow operation at a reasonable temperature. Such a camera because of its decreased size and weight has special application for space and gimbel mounted video tracking systems.

The transmission of heat from the sensor tube to the housing of the camera system by means of the packaging and support assembly makes the final small package operational at a much reduced temperature than otherwise would be possible. Actual subminiature cameras dissipating 6 watts utilizing the above packaging concepts have operated at a low housing temperature of 39°C while in an ambient environment. Thus the camera is held significantly below the 55°C housing temperature level at which electrical performance may be impaired.

Although one embodiment of the present invention has been shown and described, it is to be understood that various modifications become apparent to one skilled in the art and that other combinations and arrangements may be made in light of the above teachings.

What is claimed is:

1. A heat sink for an electron tube comprising:

a cylindrical assembly concentric with said tube for substantially the entire length of said tube and positioned in heat exchange relationship with said tube;

support means aligned axially with said cylindrical assembly and engaging and positioning said tube and said cylindrical assembly in fixed concentric relationship for securing said tube and said cylindrical assembly against vibration and wherein said support means further is positioned in heat exchange relationship with said cylindrical assembly and said tube for withdrawing heat from said cylindrical assembly and said tube; and a socket assembly adapted to receive said tube and extending into said support means, said support means shielding said socket assembly from external electrostatic pickup.

2. The heat sink for an electron tube as recited in claim 1 wherein said cylindrical assembly includes deflection coils.

3. The heat sink for an electron tube as recited in claim 1 wherein said support means is cylindrical in shape.

4. The heat sink for an electron tube as recited in claim 3 wherein said support means engages said cylindrical assembly in a slideable manner for rotating said cylindrical assembly relative to said tube.

5. The heat sink for an electron tube as recited in claim 1 wherein said socket assembly includes a tube bias board connected rigidly to said support means for positioning said support means in axial alignment with said socket assembly.

6. The heat sink for an electron tube as recited in claim 5 wherein said socket assembly further includes a socket mounted on said tube bias board and extending into said support means, said support means shielding said socket assembly from external electrostatic pickup.

7. The heat sink for an electron tube as recited in claim 1 wherein said heat sink further includes housing means enclosing said cylindrical assembly, said support means, said socket assembly and said tube and connected in heat exchange relationship to said support means for efficient heat transfer from said support means to said housing means.

8. A heat sink and support assembly for a television camera sensor tube comprising:

a cylindrical coil assembly concentric with said sensor tube for substantially the entire length of said sensor tube and positioned in heat exchange relationship with said sensor tube;

support means axially aligned with and contacting said sensor tube for maintaining said assembly in fixed concentric relationship with said sensor tube; and a socket assembly, adapted to receive said sensor tube, extending into said support means, said support means shielding said socket assembly from external electrostatic pickup.

9. The heat sink and support assembly for a television camera sensor tube as recited in claim 8 wherein said cylindrical coil assembly includes:

a thin walled cylinder;

a deflection coil assembly mounted on said cylinder; and a focus coil assembly mounted on said cylinder next adjacent said deflection coil assembly.

10. A heat sink and support assembly for a television camera sensor tube as recited in claim 8 wherein said support means includes:

a cylindrically shaped collar having a lip so constructed and arranged to receive said cylindrical coil assembly in a slidable manner for rotating said cylindrical assembly relative to said sensor tube.

11. The heat sink and support assembly for a television camera sensor tube as recited in claim 8 wherein said cylindrical coil assembly includes:

means for receiving a tool in fixed angular relationship to said coil assembly for imparting rotational movement to said coil assembly.

12. The heat sink and support assembly for a television camera sensor tube as recited in claim 11 wherein said means for receiving a tool in fixed angular relationship to said coil assembly are tabs projecting from a first end of said coil assembly.

* * * * *